United States Patent [19] [11] 4,271,462
Peters [45] Jun. 2, 1981

[54] POWER CONVERTER AND REGULATION APPARATUS

[75] Inventor: Philip H. Peters, Greenwich, N.Y.

[73] Assignee: Electric Power Research Institute, Palo Alto, Calif.

[21] Appl. No.: 944,089

[22] Filed: Sep. 20, 1978

[51] Int. Cl.³ .............................................. H02P 13/26
[52] U.S. Cl. ..................................... 363/84; 323/247; 363/126
[58] Field of Search .................. 307/149, 151; 323/56, 323/75 S, 79, 89 R; 324/119; 363/84, 125, 126

[56] References Cited

U.S. PATENT DOCUMENTS

| | | | |
|---|---|---|---|
| 1,920,618 | 8/1933 | Zierdt | 323/79 |
| 3,042,848 | 7/1962 | Muchnick et al. | 323/89 R X |
| 3,111,621 | 11/1963 | Spinks | 323/76 |
| 3,944,909 | 3/1976 | Reymond | 323/79 X |
| 4,087,701 | 5/1978 | Anderson | 323/77 X |
| 4,126,825 | 11/1978 | Houston et al. | 324/96 |

Primary Examiner—William M. Shoop
Attorney, Agent, or Firm—Flehr, Hohbach, Test, Albritton & Herbert

[57] ABSTRACT

A power converter utilizes an inverter operating at a frequency near 30 kHz to produce an RF voltage which is divided by a reactive voltage divider, one portion of the divider including a saturable reactor having a control winding which is driven by a negative feedback current from a level sensing circuit connected to the converter output. DC voltage is provided by a bridge rectifier and filter connected across the saturable reactor. The circuit is especially useful for supplying electrical power efficiently to instrumentation on multikilovolt transmission lines where a transformer cascade is used to conductively isolate apparatus operating at the potential of the transmission line from a ground level power source.

6 Claims, 8 Drawing Figures

CHARACTERISTIC INVERTER CURRENTS $$\frac{V_{DC}}{I_{DC}} = R_{DC} \simeq R_E$$

POWER CONVERTER AND REGULATION APPARATUS

BACKGROUND OF THE INVENTION

The present invention is directed to a power converter and regulation apparatus and more specifically to apparatus for use in powering electronic measuring instruments connected to the high potential side of a high voltage DC transmission line.

Conductively isolated power supplies for electronic units operating at the potential of a high voltage DC transmission line which, for example, in the case of the Pacific DC Intertie operates at a voltage of 400 kV, must be capable of withstanding open and short circuit conditions, have good voltage regulation, and be extremely reliable in operation. High reliability is especially necessary on the Pacific Intertie since scheduled shutdowns for maintenance occur only once every six months.

Such a power supply derives power from AC or DC sources on the ground and converts and delivers this power across a high voltage interface between the ground level and the 400 kV level where it can be rectified and regulated to operate measuring instrumentation. A cascade of RF transformers may be used for transferring power to the line side of the power supply. Such a transformer is disclosed and claimed in a copending application entitled "Transformer Cascade for Powering Electronics on High Voltage Transmission Lines" in the name of John M. Anderson. filed Feb. 10, 1977, Ser. No. 767,573 and now U.S. Pat. No. 4,077,701.

OBJECTS AND SUMMARY OF THE INVENTION

It is, therefore, an object of the present invention to provide an improved power converter and regulation apparatus.

It is a more specific object to provide such apparatus for use with high voltage DC transmission lines.

In accordance with the above objects there is provided a power converter and regulation apparatus for supplying a DC load comprising inverter means for producing a radio frequency (RF) voltage. An inductive voltage divider includes first inductor means of the saturable reactor type in series with a second inductor with the RF voltage being imposed across the series-connected combination and the RF output from the divider being taken across the first inductor. Rectifier means are connected across the first inductor for providing a DC output voltage. Voltage level sensing means compares the DC output voltage with a reference voltage and provides an error signal. The first inductor means includes a control winding responsive to the error signal to change the division of the RF voltage to compensate for changes in load.

DETAILED DESCRIPTION OF THE PREFERRED EMBODIMENT

Figure 1:
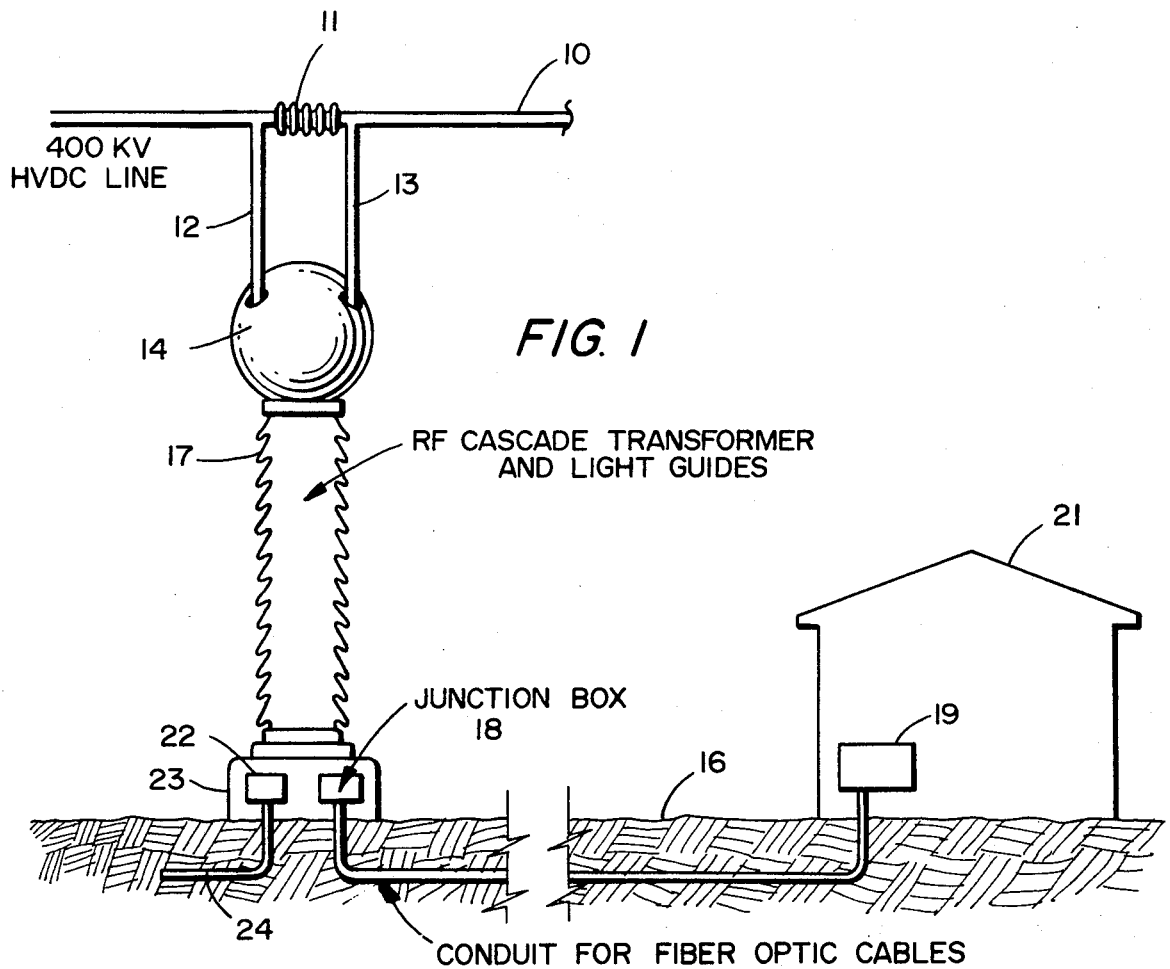
FIG. 1 is a diagrammatic view partially in cross section of a portion of a high voltage line showing the implementation of the invention.

FIG. 1 illustrates the overall environment of the present invention as used. A 400 kV high voltage DC line 10 is separated by a stress insulator 11 and by means of the drops 12 and 13 the current in the line is fed to electronic measuring units contained in a corona shield 14. Such sensing units may be those disclosed and claimed in a copending application in the name of Houston and Summerhayes, entitled Electronic Current Transducer For High Voltage Transmission Lines, Ser. No. 844,785, filed Oct. 25, 1977 and now U.S. Pat. No. 4,126,825. The corona shield 14 is supported above the ground level indicated at 16 by an insulator 17 which contains a radio frequency (RF) cascade transformer in accordance with the Anderson application and one or more fiber optic light guides such as are specified in the Houston/Summerhayes application. A junction box 18 at ground level connects to the fiber optic light guides which carry signal information corresponding to the DC line current magnitude to a ground electronics unit 19 in a control station house 21. The power to supply the electronics units contained in corona shield 14 is coupled via the RF cascade transformer from an RF power converter unit 22 located at the base of insulator 23. The power unit is supplied with readily available 110 volt AC ground power through a conduit 24.

Figure 2:
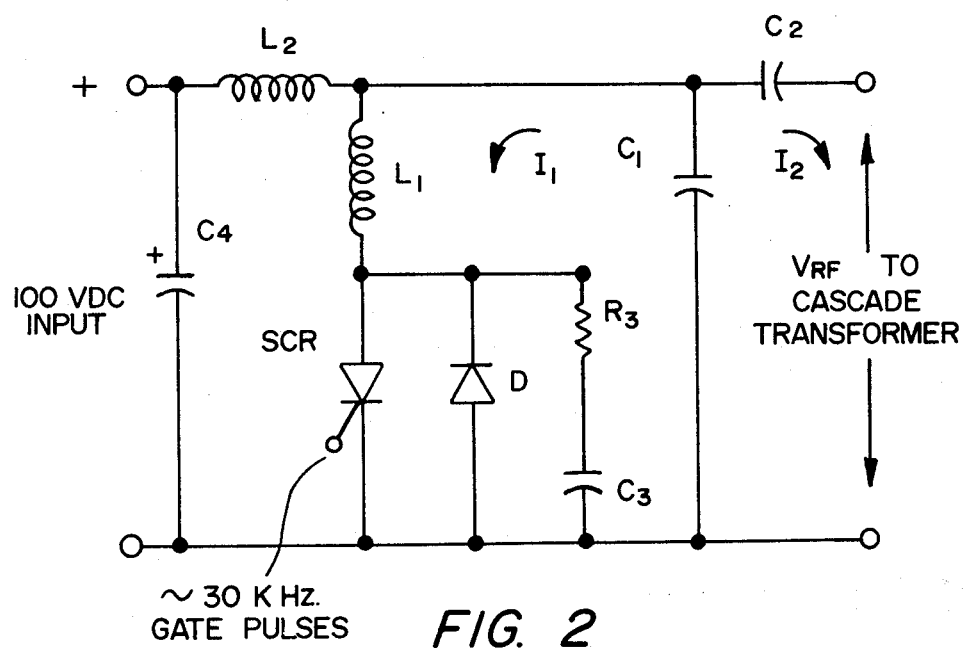
FIG. 2 is a circuit schematic of one portion of the invention.

FIG. 2 illustrates the basic circuit of the inverter portion of the power converter 22. The portions which convert the AC line voltage to a 100 volt DC input and which provide gating pulses and start-up and shutdown protection are not shown in FIG. 2. The inverter of FIG. 2 inverts the input DC voltage to a substantially sinusoidal voltage, $V_{RF}$, at its output terminals having a frequency near 30 kHz. This RF voltage is connected to the cascade transformer which magnetically couples it to the rectifying and regulating portion of the power supply circuit contained in the corona shield 14 at a local ground level of 400 kV.

The inverter of FIG. 2 is of the shunt-fed series-commutated type using a single SCR, so designated, along with a feedback diode D reverse-connected across the SCR. This general type of inverter is discussed in the book "Principles of Inverter Circuits" by B. D. Bedford and R. G. Hoft, Wiley, 1964. By means of a rectifier which rectifies the 115 volt AC line voltage (not shown), an unregulated unidirectional voltage is produced across $C_3$. This voltage drives the high frequency power inverter including the circuit elements $L_2, C_2$, $L_1, C_1$ and semiconductor devices SCR and diode D. The sinusoidal output voltage, $V_{RF}$, from the inverter is applied directly to the terminals of the primary winding of the first stage of the cascade transformer and may typically have a value of 100 V RMS.

Gate pulses to turn on the SCR at the 30 kHz frequency are derived from a temperature stable RC or crystal-controlled oscillator (not shown). The inverter circuit will commutate safely as long as the gate pulse repetition frequency is kept above a critical frequency for which the input inductive reactance of the cascade transformer and the capacitive reactance of $C_1$ and $C_2$ are resonant.

Figure 3:
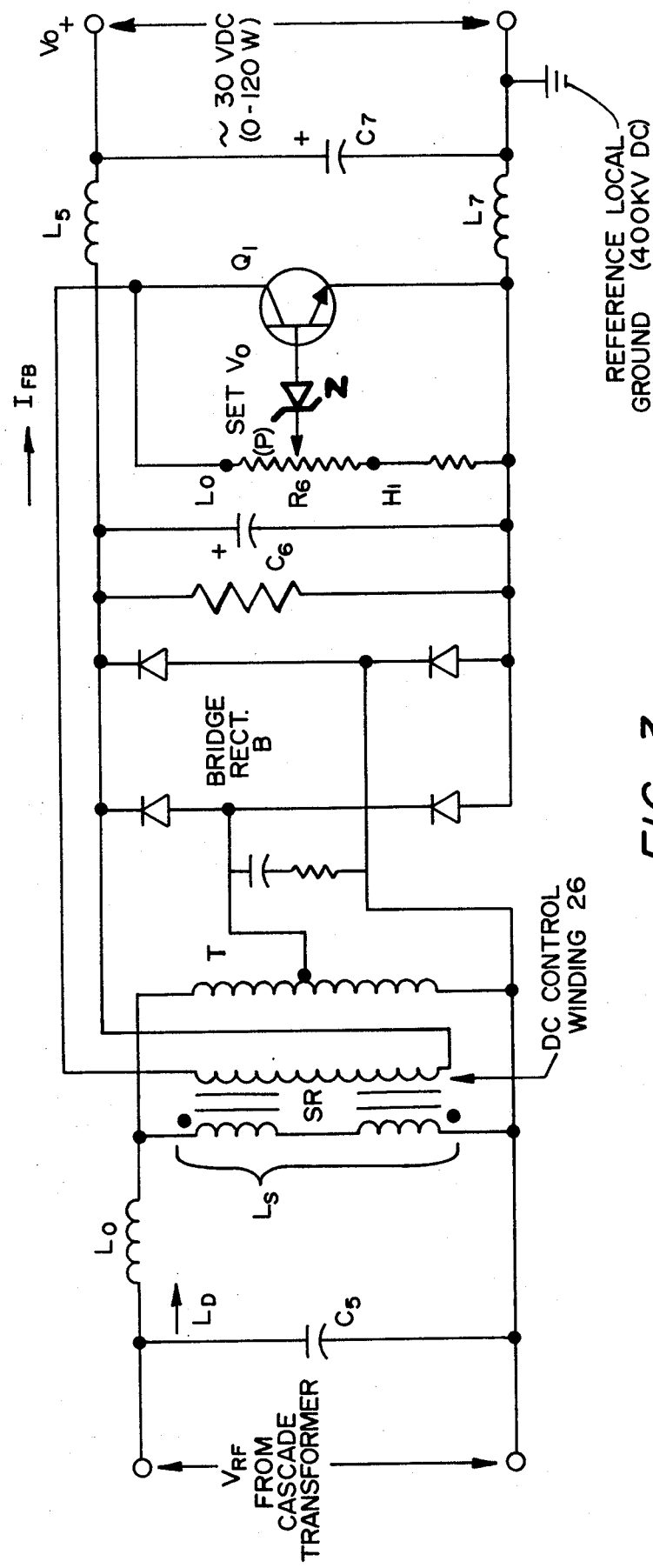
FIG. 3 is a circuit schematic of another portion of the invention.

Referring now to FIG. 3, the 30 kHz RF voltage appearing at the output end of the last transformer of the cascade transformer is applied to a parallel tuning capacitor $C_5$ and an inductive voltage divider comprising the inductor $L_O$ connected in series with the saturable reactor SR. The reactor includes two series-connected primary windings with combined inductance designated $L_S$ and a DC control winding 26. The primary windings are connected so that the RF current flowing in them does not couple to the control winding which threads both cores of the reactor. The saturable reactor operates in a typical manner where with a minimum of current through its control winding the inductance $L_S$ is a maximum, and with a maximum of current in the control winding the inductance $L_S$ is a minimum. The control winding current required to saturate the reactor is much lower than the current in the primary windings by a factor which is typically 1/10 to 1/100. The fixed value of $L_O$ is made approximately equal to the saturated inductance of $L_S$. A bridge rectifier of four diodes designated B is coupled to the saturable reactor by means of a transformer T. This transformer serves the purpose of matching the RF cascade transformer and reactance divider to the DC output load for which maximum output power is desired. The output voltage of the bridge rectifier is filtered by a capacitor $C_6$ and small filter chokes $L_5$, $L_7$ and capacitor $C_7$. Either the positive or the negative terminal of capacitor $C_7$ may be chosen as the local ground level of the electrical system atop the insulator 17 illustrated in FIG. 1.

The output DC voltage is sensed and regulated by level sensing means which include the transistor $Q_1$, potentiometer $R_6$ and Zener diode, Z. The Zener diode voltage and the voltage setting of $R_6$ provide a DC voltage reference for controlling the output DC voltage level. An output voltage level of approximately 30 volts is typical for operating electronic instruments located at the top of the insulator. The collector of $Q_1$ provides a negative feedback current to the SR control winding 26 to compensate for changes in the load across the DC output terminals. Thus, when the output DC voltage tends to rise, the voltage from point P of $R_6$ to the emitter of $Q_1$ will rise. For a voltage at P greater than the Zener voltage plus the $V_{be}$ drop of $Q_1$, the collector current of $Q_1$ will increase and cause the RF voltage applied to the rectifier to decrease by negative feedback to the control winding 26. Such a rise in output voltage may be due for example, to less load being demanded and the control winding current is then increased to reduce the inductance $L_S$. An increase in load is similarly compensated by a reduction in control current and an increase in inductance $L_S$. By use of the potentiometer $R_6$ the regulated DC output voltage is made continuously adjustable over a wide range above the Zener voltage.

From a control standpoint the inductance of $L_S$ of the reactance divider may typically be controlled from a minimum of 40 to a maximum of 800 microhenries. A typical value of the inductance of $L_O$ may be approximately 40 microhenries. For a given level of RD voltage impressed across the divider there is about a two-to-one range over which the output DC voltage can be held constant at any one level within that range by controlling $L_S$ for any load connected across $L_S$ whose resistance lies between an open circuit and about 30 ohms. If on the other hand the RF current passing through the divider ($L_O,L_S$) tends to be constant, the voltage across $L_S$, and therefore the output DC voltage can be controlled over a much wider range approaching the ratio of the maximum to the minimum values of $L_S$ or 20:1. Of course the divider is only one element of the overall inverter and regulator circuit and it is the action of the entire system to a change in loading or supply voltage which determines the range of voltage over which output regulation can be accomplished.

Figure 4:
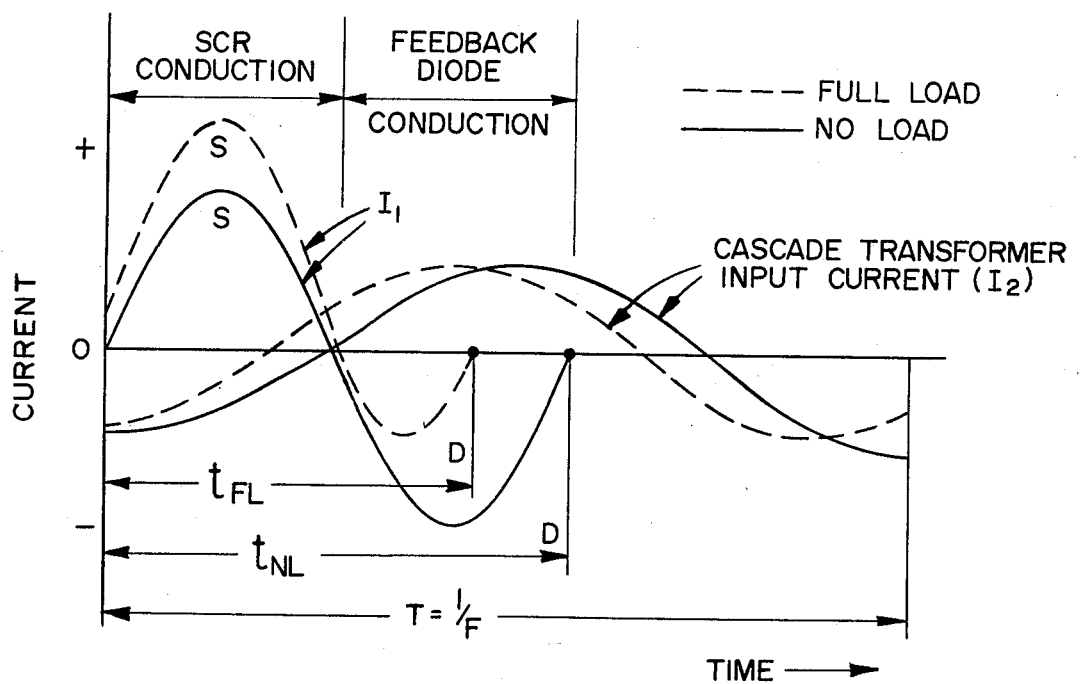
FIG. 4 are waveforms useful in understanding the invention.

Reactance control of the output voltage permits the inverter (FIG. 2) to be operated at a constant repetition rate for all output loads. The input power decreases both due to the reactance control and through the action of the feedback diode as the output loading is decreased. FIG. 4 illustrates the current $I_1$ which flows in the SCR and feedback diode pair with the solid line indicating a no load condition where no power is being delivered to the rectifier and the dashed line a full load condition. The specific behavior of $I_1$ is more fully described in the already mentioned book, "Principles of Inverter Circuits". Also shown is the sinusoidal current $I_2$ which drives the cascade transformer and line-based regulator. The current $I_2$ maintains a nearly constant magnitude due to the action of the reactance divider at the line and the power feedback diode on the ground. The phase rather than the magnitude of the current $I_2$ with respect to the RF voltage across the cascade transformer input, changes with DC output loading on the cascade transformer. The power supplied to the inverter changes so that the current $I_2$ remains essentially constant with DC output loading.

At the line (FIG. 3), the output of the cascade transformer is shunted by capacitor $C_5$ in parallel with the series reactance divider ($L_O,L_S$). With the feedback from $Q_1$ to the control winding 26 connected, the current in the $C_5$, $L_O$, $L_S$ mesh also tends to remain constant with changes in output loading of the rectifier. A portion of this current passes to the rectifier and the remainder flows through $L_S$.

When the output load is increased the portion of the RF current flowing to the rectifier must be made to increase to keep the output DC voltage constant. This is accomplished by reducing the degree of saturation of $L_S$ by reducing the DC feedback current, $I_{FB}$, supplied to the control coil 26 by voltage controlling transistor $Q_1$.

Figure 5:
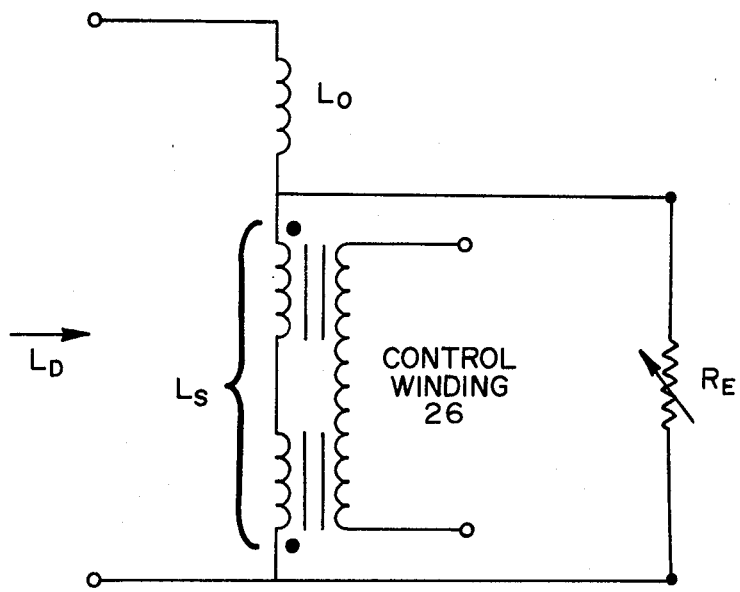
FIG. 5 is a simplified circuit of a portion of FIG. 3.
Figure 6:
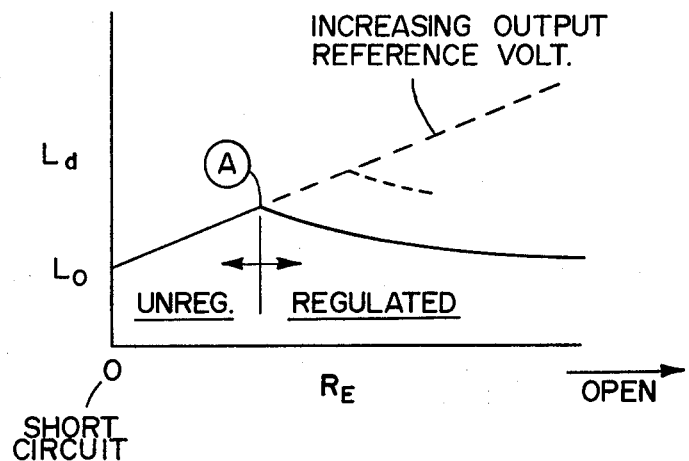
FIGS. 6, 7 and 8 are graphs useful in understanding the invention.
Figure 7:
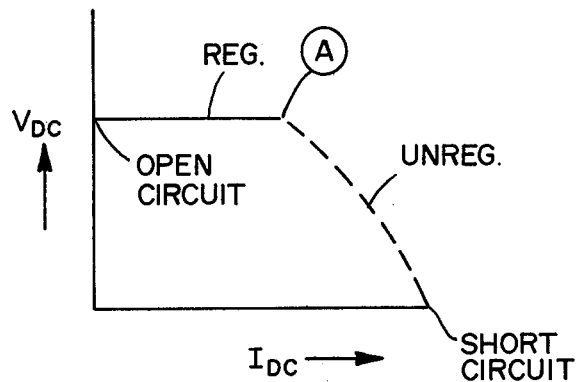

FIGS. 5 and 6 illustrate the way in which the effective inductance $L_D$ of the reactive divider changes as a function of the rectifier input resistance $R_E$. This resistance is directly proportional to the output DC load resistance, $R_{DC}=V_{DC}/I_{DC}$. As illustrated in FIG. 6 when $R_E$ is short circuited or in other words, the voltage across $R_E$ is clamped to zero, the effective inductance $L_D$ is equal to $L_O$. The inductance $L_D$ thereafter increases in an unregulated region to the point A where the rectifier input voltage is sufficient to produce a DC voltage exceeding the Zener voltage and cause control of inductance $L_S$ by transistor $Q_1$ for a given setting of $R_6$. From FIG. 7 it may be seen that as $R_E$ is increased above point A until an open circuit is reached, a flat regulation characteristic is produced. Also the value of $L_D$ again decreases toward the value $L_O$ as shown in FIG. 6. Thus under short circuit conditions when $R_E$ is zero the reactance of $L_S$ is very high and under open circuit conditions when $R_E$ is infinite the reactance of $L_S$ is very low due to the feedback action. For either extreme the voltage across the parallel combination of $L_S$ and $R_E$ is very low and the resistive loading is very small.

Referring to FIG. 6 the reference point A, of course, is adjustable and can be made to appear anywhere along the dashed line labeled "Increasing Output Reference Voltage".

Figure 8:
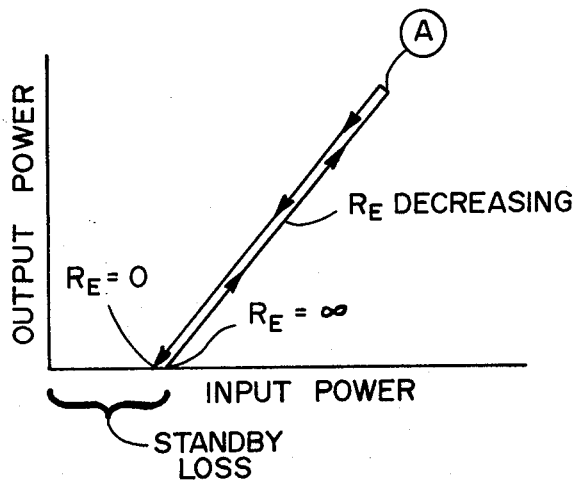

FIG. 8 illustrates the variation of DC output power to the DC input power supplied to the ground-based SCR inverter as the output load resistance $R_{DC}$ is changed from an open circuit to a short circuit. In short or open circuit conditions both system input powers are low and essentially equal in magnitude. These are standby losses and consist mainly of the inverter commutating loss, loss in the cascade transformer, and losses in $C_5$ and $L_O$. Maximum power is produced at highest efficiency for zero control current at point A. The effective inductance $L_D$, which the inverter circuit of FIG. 2 sees at the input to the cascade transformer is essentially $L_O$ for both open and short circuit conditions. No power is delivered to the rectifier circuit in either case.

Thus the present invention provides an efficient power converter apparatus where the output voltage is adjustable and regulated and independent of supply voltage variations and output loading over a wide range. The converter is both short and open circuit stable. The short and open circuit input power levels are low and essentially equal in magnitude. Transformer coupling at the inverter frequency affords conductive isolation between the supply and output voltage levels. Regulation of the output DC voltage against changes in output loading or inverter supply voltage is accomplished with no other coupling between the inverter and isolated regulator than the cascade transformer. Components can be relatively small, low in cost, and light in weight when the circuit is designed to operate in the multikilohertz frequency region. Output power control and regulation are achieved with passive components and no high power series-pass or load-shunting solid state devices are employed to carry the output current. The circuit is highly reliable and generally applicable to power conditioning systems supplying controlled power levels ranging from a few watts to several kilowatts.

What is claimed is:

1. Power converter and regulation apparatus for supplying a DC load comprising: inverter means for producing a radio frequency (RF) voltage; an inductive voltage divider including first inductor means of the saturable reactor type in series with a second inductor said RF voltage being imposed across said voltage divider; RF cascade transformer means for connecting said inverter means to said voltage divider but conductively isolating them; rectifier means connected across said first inductor means for providing a DC output voltage; voltage level sensing means for comparing said dc output voltage with a reference voltage and providing an error signal, said first inductor means including a control winding responsive to said error signal to change said division of said RF voltage to compensate for changes in said load the windings of said first inductor means being connected relative to said control winding so that the RF current in said first inductor means does not couple to said control winding.

2. Apparatus as in claim 1 where said inverter is a shunt-fed series-commutated single silicon controlled rectifier (SCR) responsive to a gating voltage having said radio frequency and with a feedback diode connected across said SCR.

3. Apparatus as in claim 1 said saturable reactor in response to its control winding varies its inductance to a maximum value at least an order of magnitude greater than the inductance of said second inductor.

4. Apparatus as in claim 1 where said inverter means is responsive to the minimum and maximum values of inductance of said voltage divider means representing open and short circuit load conditions respectively for delivering no power to said rectifier means.

5. Apparatus as in claim 1 where said DC load and inductive voltage divider means are referenced to a local ground whose potential is different than the ground level to which the inverter means is connected and including said RF cascade transformer means for connecting said inverter means to said voltage divider means.

6. Apparatus as in claim 1 where said control winding is responsive to change in said RF voltage to change said division.

* * * * *